United States Patent

Albritton

[15] 3,640,514
[45] Feb. 8, 1972

[54] AERATION

[72] Inventor: George Washington Albritton, Houston, Tex.

[73] Assignee: Ashbrook Corporation, Houston, Tex.

[22] Filed: Dec. 3, 1970

[21] Appl. No.: 94,803

[52] U.S. Cl. ...................... 261/91, 261/120, 210/242, 415/110
[51] Int. Cl. ............................................................B01f 7/22
[58] Field of Search ...................... 210/242; 261/91, 93, 120; 415/110

[56] References Cited

UNITED STATES PATENTS

| | | | |
|---|---|---|---|
| 2,963,268 | 12/1960 | Smile et al. | 415/110 |
| 3,044,744 | 7/1962 | Berlyn | 415/110 |
| 3,521,864 | 7/1970 | Welles, Jr. | 261/91 |

Primary Examiner—Tim R. Miles
Assistant Examiner—Steven H. Markowitz
Attorney—Martin Kirkpatrick

[57] ABSTRACT

Aeration apparatus comprising a support, preferably a float having a load waterline and a cylindrical duct with a vertical axis and an interior peripheral surface, the duct providing a vertical flow passage. An impeller is mounted in the duct with its axis coincident with the axis of the duct. There are provided impeller thrust bearings supporting the impeller in the duct, preferably including a rubber bearing element positioned below the load waterline for water lubrication thereof. Such bearings include a peripheral bearing element mounted on and surrounding the impeller in cooperating thrust bearing relationship with a peripheral bearing element mounted on the interior peripheral surface of the duct. Impeller driving means are provided including a motor mounted on the support thereabove and having motor bearings supporting a drive shaft extending downwardly therefrom with its axis preferably coincident with that of the impeller and duct. For connecting the motor drive shaft and the impeller, there are provided torque transmitting coupling means permitting relative axial movement of the impeller and motor shaft, thus preventing imposition on the motor bearings of impeller induced thrust loads.

5 Claims, 4 Drawing Figures

AERATION

This invention relates to aerators and more particularly to surface aerators of the vertical impeller type for aerating a body of water by propelling a stream of water from it above its surface.

Floating surface aerators of the vertical impeller type are well known, being shown and described, for example, in U.S. Pat. No. 3,320,160. Such aerators are highly effective at least in small sizes, but have provided to be unreliable in large sizes, in that they become increasingly prone to driving motor bearing failures as the size and power of the aerators is increased.

Accordingly, it is a major object of the present invention to provide a novel surface aerator capable of being manufactured in large sizes, yet one in which motor bearing failures are largely eliminated.

The above and still further objects of the present invention are uniquely accomplished by providing aeration apparatus comprising a support, preferably a float having a load waterline, having a cylindrical duct with a vertical axis and an interior peripheral surface, the duct providing a vertical flow passage. An impeller is mounted in the duct with its axis coincident with the axis of the duct. There are provided impeller thrust bearing means supporting the impeller in the duct, preferably including a rubber bearing element positioned below the load waterline for water lubrication thereof. Such means include a peripheral bearing element mounted on and surrounding the impeller in cooperating thrust bearing relationship with a peripheral bearing element mounted on the interior peripheral surface of the duct. Impeller driving means are provided including a motor mounted on the support thereabove and having motor bearings supporting a drive shaft extending downwardly therefrom with its axis preferably coincident with that of the impeller and duct. For connecting the motor drive shaft and the impeller, there are provided torque transmitting coupling means permitting relative axial movement of the impeller and motor shaft, thus preventing imposition on the motor bearings of impeller-induced thrust loads.

For the purpose of more fully explaining the above as well as further objects and features of the invention, reference is now made to the following detailed description of a preferred embodiment thereof, taken together with the accompanying drawings, wherein.

Figure 1:
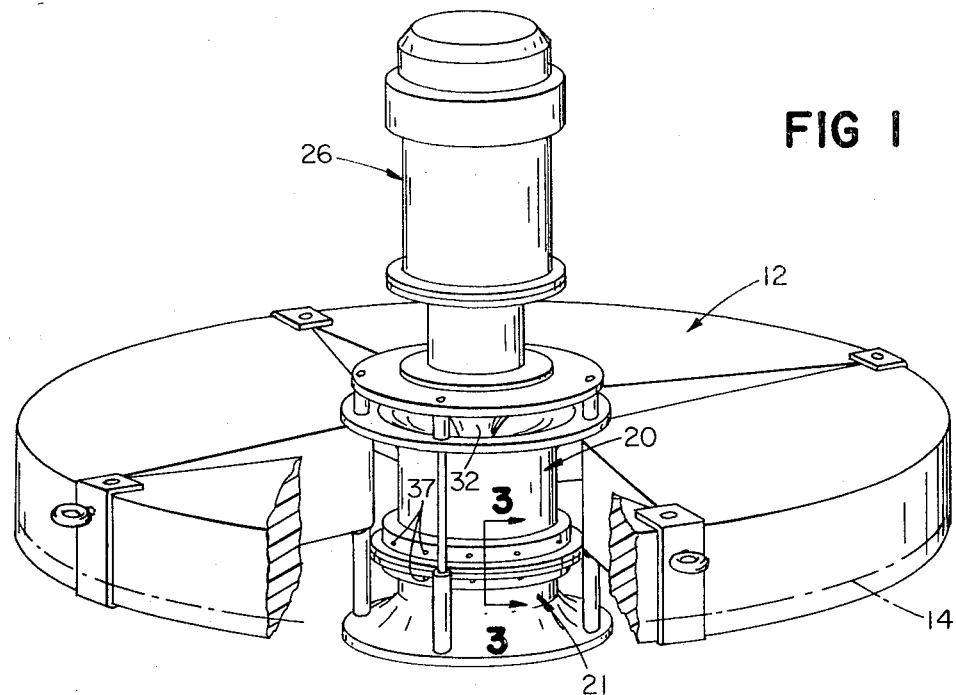
FIG. 1 is an isometric view, partly broken away, of the aerator of the invention.
Figure 4:
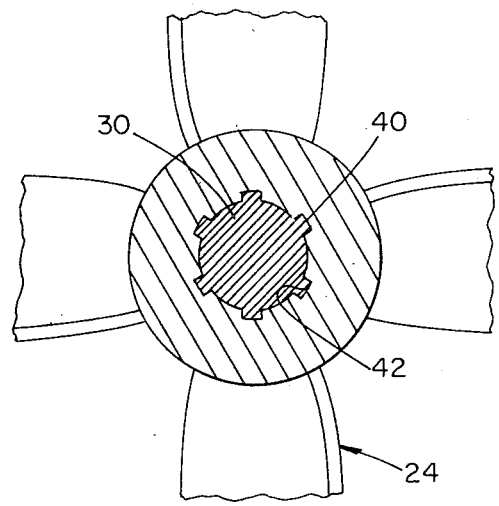
FIG. 4 is a horizontal sectional detail of the portion of FIG. 2.
Figure 3:
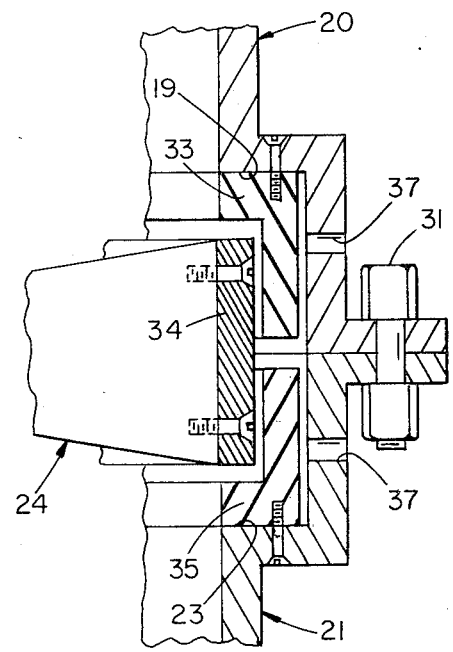
FIG. 3 is a vertical sectional detail of the portion of FIG. 2.
Figure 2:
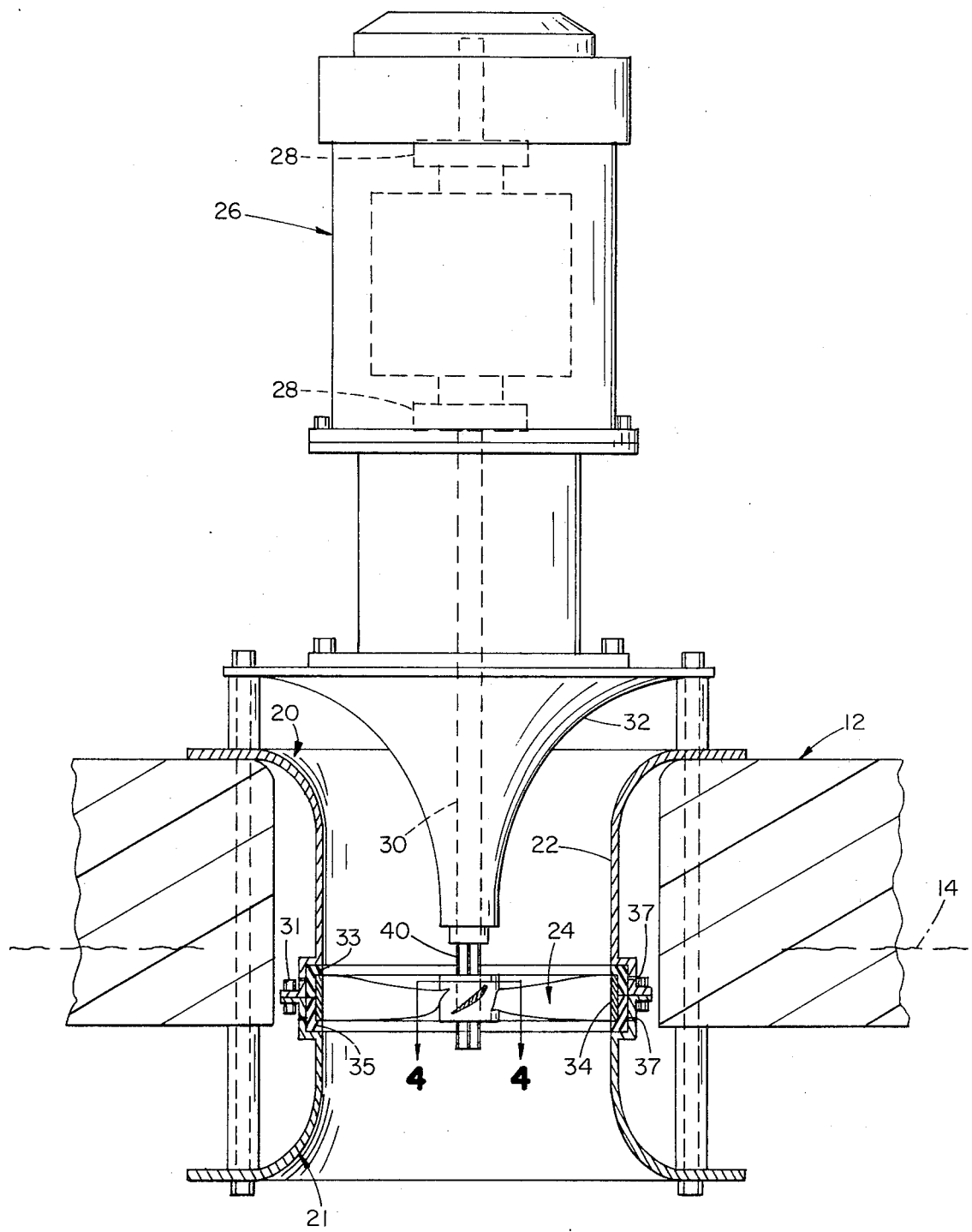
FIG. 2 is a vertical section of a portion of the aerator of FIG. 1.

In FIGS. 1 through 4 is shown floating aeration apparatus according to the invention, for aerating a body of water by propelling a stream of water above its surface. In general, such apparatus comprises a floating support structure 12, with a load waterline 14 and generally circular in shape, having a central opening within which is mounted the aerator assembly. Such assembly includes a central cylindrical duct, comprising an upper duct member 20 and a lower duct member 21, said duct having a vertical axis and an interior peripheral surface 22 providing a vertical flow passage. Upper and lower duct members 20 and 21 are provided with cooperating offset end portions and outwardly extending flanges attached to one another by suitable bolts 31, as hereinafter more fully explained. An impeller 24 is mounted in said duct with its axis coincident with the axis of said duct and an impeller driving motor 26 is mounted on support structure 12 thereabove. Motor 26 has motor bearings 28 supporting a drive shaft 30 extending downwardly therefrom with its axis coincident with that of said impeller and said duct. A deflector element 32 is provided beneath motor 26 for deflecting laterally water impelled upwardly through duct member 20.

According to the present invention, in order to prevent imposing thrust loads induced by impeller 24 on motor bearings 28, said impeller is supported and mounted independently of motor 26 and driven thereby in such manner that only torsion loads are imposed on said motor bearings by the impeller. This is accomplished by mounting impeller 24 within the duct about its outer periphery in a surrounding bearing structure, supporting impeller 24 in said duct below its load waterline 14. Said bearing structure includes a peripheral bearing ring element 34 preferably of metal, mounted on and surrounding impeller 24 in cooperating thrust bearing relationship with an external peripheral bearing assembly comprising upper and lower L-shaped elements 33,35 respectively, mounted on the interior peripheral surface of the duct, said bearing elements 33,35 being of rubber for water lubrication thereof, of the type shown, for example, in U.S. Pat. No. 3,487,804. To this end, bearing elements 33,35 are mounted in an outwardly extending recess having upper and lower end walls 19,23, respectively, said recess being formed by the connected offset end portions of upper duct member 20 and lower duct member 21. Bearing elements 33,35 have their radially inwardly extending legs adjacent the upper and lower end walls 19,23 of said recess, providing a groove having upper and lower thrust bearing surfaces in which the impeller bearing ring element 34 is received. A plurality of radially extending openings 37 are provided through duct members 20,21 for free access of water for the purpose of lubricating the bearing assembly.

For transmitting torque from motor 27 to impeller 24, free from thrust load transmission, shaft 30 is coupled to the hub of impeller so as to permit free relative axial movement of said impeller and said shaft. This is accomplished by providing a spline connection between said hub and shaft, including an external spline 40 on the lower end portion of shaft 30 and an internal spline 42 in the hub of impeller 24. Other means for connecting said shaft and impeller so as to provide the necessary free axial movement therebetween preventing imposition on the motor bearings 28 of impeller-induced thrust loads may be used as well.

In operation, the aerator of the invention operates in the conventional manner to impell water upwardly and outwardly from the top of its duct. However, due to the unique impeller mounting and driving arrangement of the invention, with impeller 24 rotatably mounted in and supported by the central duct assembly, it is unable to transmit any thrust loads created, for example, by impeller cavitation, to the motor bearings 28, by reason of the sliding connection therebetween. As a result, the motor bearings are not subjected to loads for which conventional motor bearings are not designed, and hence are much less subject to failure in operation.

What is claimed is:

1. Aeration apparatus for aerating a body of water by propelling a stream of water above the surface of said body comprising
    a support having a cylindrical duct with a vertical axis and an interior peripheral surface, said duct providing a vertical flow passage
    an impeller in said duct with its axis coincident with the axis of said duct
    impeller thrust bearing means supporting said impeller in said duct, including a peripheral bearing element mounted on and surrounding said impeller in cooperating thrust bearing relationship with a peripheral bearing element mounted on the interior peripheral surface of said duct
    impeller driving means including a motor mounted on said support thereabove and having motor bearings supporting a drive shaft extending downwardly therefrom
    torque transmitting coupling means connecting said motor drive shaft and said impeller, said coupling means permitting relative axial movement of said impeller and motor shaft preventing imposition on said motor bearings of impeller-induced thrust loads.

2. Aeration apparatus as claimed in claim 1 wherein said motor drive shaft has its axis coincident with that of said impeller and said duct.

3. Aeration apparatus as claimed in claim 1 wherein said support is a float having a waterline.

4. Aeration apparatus as claimed in claim 3 wherein said impeller is positioned below said waterline and its said bearing means includes a water-lubricated rubber bearing element.

5. Floating aeration apparatus for aerating a body of water by propelling a stream of water above the surface of said body comprising a floating support having a load waterline and a central cylindrical duct with a vertical axis and an interior peripheral surface, said duct providing a vertical flow passage an impeller in said duct with its axis coincident with the axis of said duct impeller thrust bearing means supporting said impeller in said duct below said load waterline, including a peripheral bearing element mounted on and surrounding said impeller in cooperating thrust bearing relationship with a peripheral bearing element mounted on the interior peripheral surface of said duct, one of said bearing elements being of rubber for water lubrication thereof impeller driving means including a motor mounted on said support thereabove and having motor bearings supporting a drive shaft extending downwardly therefrom with its axis coincident with that of said impeller and said duct and torque transmitting coupling means connecting said motor drive shaft and said impeller, said coupling means permitting free relative axial movement of said impeller and motor shaft preventing imposition on said motor bearings of impeller-induced thrust loads.

* * * * *

UNITED STATES PATENT OFFICE
CERTIFICATE OF CORRECTION

Patent No. 3,640,514          Dated February 8, 1972

Inventor(s) George Washington Albritton

It is certified that error appears in the above-identified patent and that said Letters Patent are hereby corrected as shown below:

Column 2, line 14, "3,487,804" should be --3,487,805--;

Column 2, line 27, "27" should be --26--.

Signed and sealed this 5th day of September 1972.

(SEAL)
Attest:

EDWARD M. FLETCHER, JR.          ROBERT GOTTSCHALK
Attesting Officer                Commissioner of Patents